(12) United States Patent
White et al.

(10) Patent No.: US 11,157,431 B2
(45) Date of Patent: Oct. 26, 2021

(54) SYSTEM, APPARATUS AND METHOD FOR MULTI-DIE DISTRIBUTED MEMORY MAPPED INPUT/OUTPUT SUPPORT

(71) Applicant: Intel Corporation, Santa Clara, CA (US)

(72) Inventors: Bryan R. White, Chandler, AZ (US); Aravindh Anantaraman, Folsom, CA (US); Ankur Shah, Folsom, CA (US); Altug Koker, El Dorado Hills, CA (US); David Puffer, Tempe, AZ (US); Aditya Navale, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/447,025

(22) Filed: Jun. 20, 2019

(65) Prior Publication Data

US 2019/0303334 A1 Oct. 3, 2019

(51) Int. Cl.
*G06F 13/36* (2006.01)
*G06F 13/40* (2006.01)
*G06T 1/20* (2006.01)
*G06F 13/42* (2006.01)

(52) U.S. Cl.
CPC ...... *G06F 13/4027* (2013.01); *G06F 13/4282* (2013.01); *G06T 1/20* (2013.01); *G06F 2213/0026* (2013.01)

(58) Field of Classification Search
CPC .. G06F 13/00; G06F 13/4027; G06F 13/4282; G06F 2213/0026; G06T 1/20
See application file for complete search history.

(56) References Cited

U.S. PATENT DOCUMENTS

| 8,058,897 | B1 * | 11/2011 | Lu | G06F 30/34 |
| | | | | 326/38 |
| 8,121,150 | B1 * | 2/2012 | Nelson | H04L 49/901 |
| | | | | 370/471 |
| 2011/0080920 | A1 * | 4/2011 | Klinglesmith | G06F 13/4027 |
| | | | | 370/419 |

(Continued)

OTHER PUBLICATIONS

U.S. Appl. No. 16/243,624, filed Jan. 9, 2019, entitled "Workload Scheduling and Distribution on a Distributed Graphics Device," by Balaji Vembu, et al.

(Continued)

*Primary Examiner* — Tim T Vo
*Assistant Examiner* — Kim T Huynh
(74) *Attorney, Agent, or Firm* — Trop, Pruner & Hu, P.C.

(57) ABSTRACT

In one embodiment, a method includes: receiving, in a root tile of an accelerator device having a plurality of tiles, a message from a processor, the message comprising a register write request to a register of a first remote tile of the plurality of remote tiles; decoding, in an endpoint controller of the root tile, a system address of the message to identify a destination tile for the message, based at least in part on a base address register decode of the system address; and in response to identifying the first remote tile as the destination tile, updating a first portion of an address offset field of the system address to a predetermined value and directing the message to the first remote tile coupled to the root tile via a sideband interconnect. Other embodiments are described and claimed.

20 Claims, 12 Drawing Sheets

(56) References Cited

U.S. PATENT DOCUMENTS

| | | | |
|---|---|---|---|
| 2015/0067368 A1* | 3/2015 | Henry | G06F 1/3237 |
| | | | 713/322 |
| 2018/0218530 A1 | 8/2018 | Vembu et al. | |
| 2018/0308198 A1 | 10/2018 | Appu et al. | |
| 2019/0206017 A1 | 7/2019 | Lin et al. | |

OTHER PUBLICATIONS

PCT International Application No. PCT/CN2018/118649, Filed Nov. 30, 2018, entitled "Apparatus and Method for a Virtualized Display," by Intel Corporation.
U.S. Appl. No. 16/397,217, filed Apr. 29, 2019, entitled "Memory Mapped Virtual Doorbell Mechanism," by Bryan R. White, et al.

\* cited by examiner

SYSTEM, APPARATUS AND METHOD FOR MULTI-DIE DISTRIBUTED MEMORY MAPPED INPUT/OUTPUT SUPPORT

TECHNICAL FIELD

Embodiments relate to communications in an accelerator device.

BACKGROUND

In many computing systems, certain functionality may be performed in an accelerator device such as a separate integrated circuit, card or so forth implemented within the system. Such accelerator device can increase efficiency for performing certain tasks, yet often additional performance is desired. While multiple accelerator devices can be incorporated into a system, such configuration can raise complexity, as often times each accelerator device is configured as a peripheral device such as a Peripheral Component Interconnect Express (PCIe)-attached device having its own bus device function identifier. Such configuration increases routing complexities and so forth.

DETAILED DESCRIPTION

In various embodiments, an endpoint controller of a root tile may include device logic circuitry to perform device decode and routing decisions for local tile intellectual property (IP) circuits and for remote tile targets. Root tile-to-remote tile accesses flow from the device logic circuit (also called a "device block") of the root tile to a remote tile device block. The remote tile device block then decodes and forwards the accesses to a local tile IP target. Similarly, the remote tile device block may forward an access to the root tile device block if targeted. The root tile decodes and forwards the access to a root tile local IP or to a targeted remote tile.

In embodiments, remote tile-to-remote tile accesses first route to the root tile. Upon root tile arrival, the root tile determines the remote target and forwards the access. And in turn, the targeted remote tile decodes and forwards the access to the appropriate local IP block. This policy choice of always routing to the root tile allows message topology choice options. In an alternative embodiment, remote-to-remote message communication can be optimized to directly route remote tile-to-remote tile. Embodiments for memory mapped input/output (MMIO) distribution allow a single Peripheral Component Interconnect Express (PCIe) device to scale in capabilities by connecting multiple instantiations of the same silicon die together. As a result, performance capabilities can be scaled by adding more die, yet still presenting a single PCIe device software view.

Figure 1:
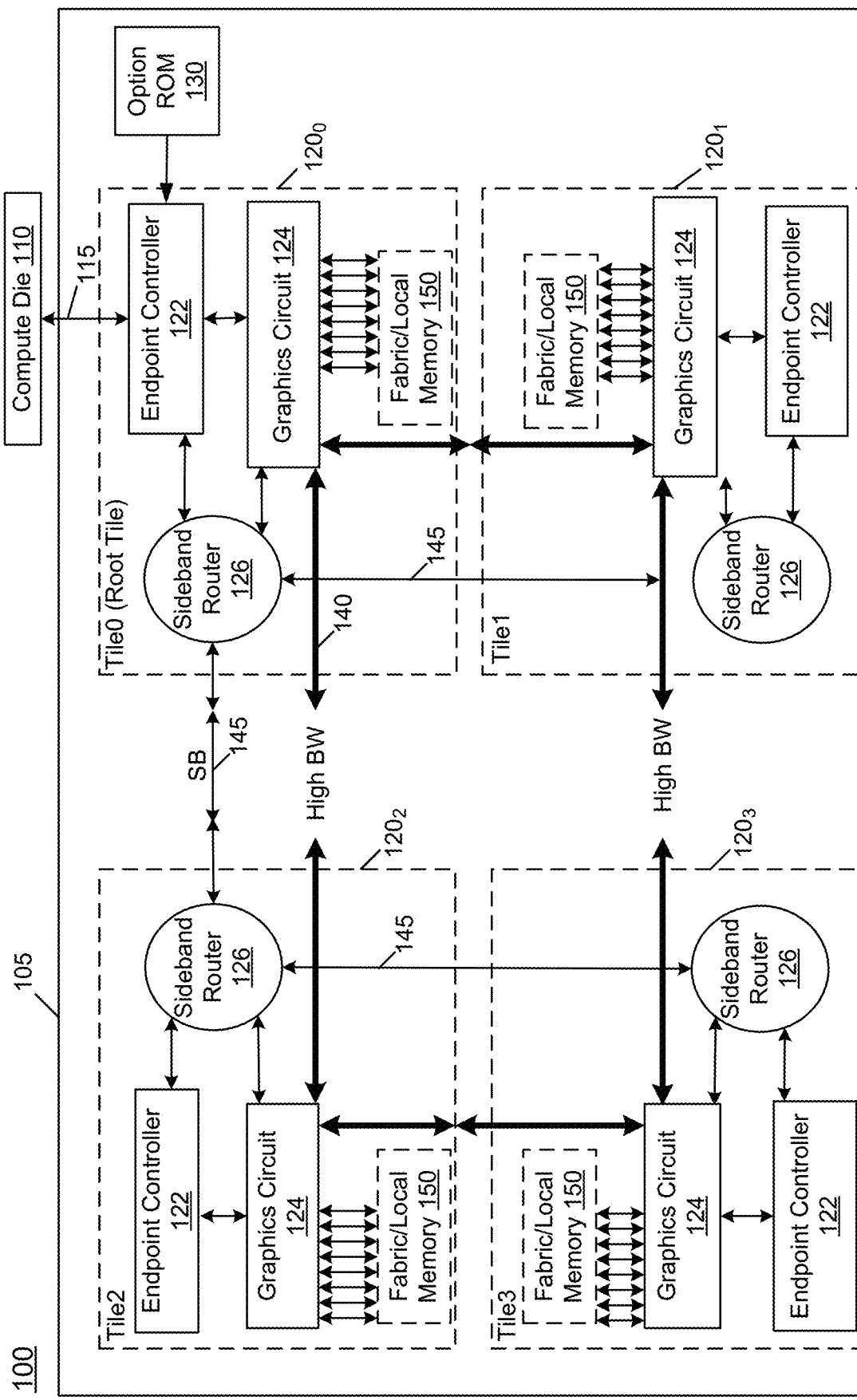
FIG. 1 is a block diagram of a computing system in accordance with an embodiment of the present invention.

Referring now to FIG. 1, shown is a block diagram of a computing system in accordance with an embodiment of the present invention. More specifically, FIG. 1 shows a computing system 100 including an accelerator device 105, which in the embodiment shown may be implemented as a graphics or other accelerator card. Although embodiments herein relate to an accelerator device that is implemented using graphics circuitry, understand the scope of the present invention is not limited in this regard and in other embodiments, other types of accelerators, including field programmable gate arrays, fixed function units or so forth may be used as the processing circuitry.

In any event, FIG. 1 shows coupling of accelerator device 105 to a compute die 110 via an interconnect 115, which in an embodiment may be a PCIe interconnect. Compute die 110 may include a plurality of cores such as a set of homogeneous or heterogeneous cores. Understand that while a single compute die 110 is shown for ease of illustration, in various implementations computing system 100 may include a plurality of compute die, either multiple die included in a multichip package or multiple die present in separate integrated circuit packages. The term "tile" herein refers to a single semiconductor (e.g., silicon) die that includes, at a minimum, interface circuitry, controller circuitry and processing circuitry. While these tiles may be implemented with graphics processing circuitry to perform graphics operations or other specialized computing functions that are amenable to high levels of parallel processing, other embodiments may implement other specified accelerator circuitry.

With an embodiment as in FIG. 1, accelerator device 105 includes a plurality of individual tiles $120_0$-$120_3$. Understand that four tiles are shown for the sake of explanation, and in different embodiments the accelerator device may include 2, 4, 8 or other number of individual tiles. Furthermore, for ease of manufacture, each of tiles 120 may be identically designed, in that each tile 120 includes all the same hardware components. However, with an arrangement as in FIG. 1, certain circuitry may only be enabled on a root tile $120_0$ and not on remote tiles $120_{1-3}$. In this way, root tile $120_0$ may act as a primary interface to compute die 110 to receive incoming messages such as write transactions to program registers for each of multiple tiles 120 and direct such messages to the appropriate tile. Understand that remote tiles $120_1$-$120_3$ may be designed and manufactured identically as root tile $120_0$ and thus may include the same circuitry as root tile $120_0$, and thus in FIG. 1, the same reference numerals used to refer to the same components. However, such remote tiles may be differently configured, in that there is no direct connection to an option read only memory (ROM) or compute die. As such, various interface circuitry, including PCIe endpoint circuitry within these remote tiles may be disabled.

Accelerator device 105 thus acts as a single PCIe device, e.g., a single graphics accelerator card that may interact with a remainder of computing system 100 as a single PCIe graphics device having a single bus device function (BDF) identifier. In this way, performance scaling of a single PCIe device can be realized to provide capabilities greater than possible with a single silicon die, by connecting multiple dies together and representing the multiple die structure to a remainder of a system as a single PCIe device.

To this end, note that root tile $120_0$ is the only tile that directly couples to compute die 110. Furthermore as will be described herein, root tile $120_0$ is the only tile that directly couples to a storage device, namely an option ROM 130. Option ROM 130 may be implemented as a flash memory or other non-volatile memory to store code for configuration of and execution within accelerator device 105. With this configuration of tile $120_0$ as a root tile, root tile $120_0$ is the only tile to directly communicate with firmware and other system software stored on option ROM 130. Such firmware and/or other system software may be used to configure capabilities for accelerator device 105, including capabilities of root tile $120_0$ and remote tiles $120_{1-3}$.

With reference to root tile $120_0$, direct connection to compute die 110 is via PCIe interconnect 115 which in turn couples to an endpoint controller 122. Endpoint controller 122 may include a PCIe endpoint and further may include interface circuitry to enable communication with additional components via another communication protocol such as an Intel® On Chip Scalable Fabric (IOSF) communication protocol. Further, endpoint controller 122 also includes logic circuitry to execute a kernel mode driver. Logic circuitry also may be present within endpoint controller 122 to manage a configuration space, calculate base address registers (BARs) for the various tiles, and manage access to capability structures within endpoint controller 122.

Still further, endpoint controller 122 may be configured with a multi-tile configuration register. This configuration register may report multi-tile configuration information. In one embodiment, this multi-tile configuration register may include a first field to store a tile number assignment for the given tile. In addition, the multi-tile configuration register may include another field to store a count of remote tiles. In this way, each tile, via its copy of this register, may comprehend its own tile number as well as the number of co-located tiles. Understand that additional configuration registers may be present within endpoint controller 122, including a set of configuration registers which may be configured to store configuration information, both for purposes of root tile $120_0$ as well as for configuring the same configuration values for remote tiles $120_1$-$120_3$. That is, while the various tiles may be identically configured to include this set of configuration registers, only those present in root tile $120_0$ may be active, while the configuration register space of the remote tiles may be bypassed and unused.

Endpoint controller 122 further includes interface circuitry to enable communication with a graphics circuit 124, e.g., via a primary channel of an IOSF interconnect 125 coupled to endpoint controller 122. Note that a primary channel of the IOSF interconnect that couples between endpoint controller 122 and graphics engine 124 is not used on remote tiles, to reduce complexity. Communication with other tiles 120 may be implemented using a sideband interconnect system, e.g. an IOSF sideband interconnect system including a plurality of sideband interconnects 145 forming the sideband interconnect system that in turn couple to corresponding sideband routers 126 present within each of tiles 120. Sideband routers 126 may store routing tables that may be accessed to determine an appropriate destination for an incoming message. Note that such routing information includes information as to destinations present on the local tile as well as to an identification of a corresponding endpoint controller of the non-local tiles. Note that the sideband interconnect system may be used for all register-related communications. As such, incoming register accesses received from compute die 110 may be forwarded on the sideband interconnect system to a destination.

Graphics circuit (also referred to herein as "graphics engine") 124 is shown at a high level in FIG. 1. In various embodiments, graphics circuit 124 may include a plurality of individual graphics processing units (GPUs). For example, each graphics engine 124 may include 64 individual GPUs, each configured to perform parallel processing of tasks provided to it. In turn, graphics circuit 124 may couple via a memory interconnect 128 to a local memory 150 attached to that tile 120 as local memory present on the same card. To enable high-speed communications for data transfers with local memory 150, a plurality of high-bandwidth interconnects 140 may couple between graphics engines 124.

In an embodiment, endpoint controller 122 includes graphics device logic, including a PCIe configuration space. Note that with regard to root tile $120_0$, endpoint controller 122 has an activated PCIe interface coupled to interconnect 115, and further has activated primary interfaces to interface both via a primary channel with the PCIe interface and with graphics circuit 124. Endpoint controller 122 further includes an activated sideband interface to interface with a sideband router 126, via a sideband channel. Still further, endpoint controller 122 f root tile $120_0$ further includes an attached flash memory interface to which option ROM 130 accesses.

Controller 122 of route tile $120_0$ may comprehend a superset of PCIe exposed BAR space for all tiles. For example, a device may expose 3 BARs in PCIe configuration space: 1) GTTMMADR (MMIO registers); 2) LMEM-BAR (local memory (LM)); and 3) OptionROM (option ROM flash device).

Controller 122 of root tile $120_0$ further may aggregate BAR size for all tiles, including MMIO BARS and local memory BARs. Note that this calculated BAR size includes all enabled tiles, and controller 122 may forward calculated BARs for MMIO registers based on tile decode or forward to a local IP target. In addition, endpoint controller 122 may calculate the local memory BAR size and forward to local memory. Note that this BAR size includes memory attached to all enabled tiles. Endpoint controller 122 of root tile 120 may further be configured to handle interrupts, which remote tiles may send for informing of tile-based status. From such interrupts, endpoint controller 122 may generate interrupts to be forwarded to compute die 110 via interconnect 115. Understand that endpoint controller 122 of root tile 120 may further be configured to perform error handling, in response to errors received from remote tiles. From received error messages, endpoint controller 122 may generate error messages or interrupts to be forwarded to compute die 110 via interconnect 115.

Note that endpoint controllers 122 of remote tiles $120_{1-3}$ may be differently configured to handle cross-tile behavior. For example, configuration register space for these endpoint controllers is uninitialized and bypassed, avoiding the need to keep each tile synchronized. Still further, there is no flash memory directly attached to these endpoint controllers, and no transactions flow on an interface that would interface to PCI endpoint circuitry present on the tile. The remote tile endpoint controllers may target the endpoint controller of the root tile and may be configured to support various messaging, including remote-to-local register communications, remote-to-remote tile communications, and remote tile-to-remote tile, via the root tile, as all cross-tile remote accesses may target the root tile.

In an embodiment, a PCIe-received memory mapped I/O address register write may be forwarded from the endpoint controller of the root tile to the endpoint controller of the remote tile as a non-posted write, such that with a corresponding non-posted completion, PCIe write register ordering may be maintained. For performing interrupt messaging, an endpoint controller of a remote tile may perform a write transaction to an interrupt register of the root tile, to set the relevant tile number status, which results in generation of a message signaling interrupt (MSI). To this end, the root tile may include an interrupt register having a plurality of state fields each associated with one of the tiles. In response to a write transaction from a first remote tile including certain status information and/or an interrupt, the endpoint controller may write status information into a corresponding one of the plurality of state fields. A similar interrupt strategy may be used for performing virtual function-related interrupts. And similarly, for error information communication, an endpoint controller of a remote tile may perform a write transaction to advise the root tile of an error. In an embodiment, the root tile may include an error register having a plurality of state fields each associated with one of the tiles. In response to this type of error write transaction from a first remote tile, the endpoint controller may write status information into a corresponding one of the plurality of state fields. And in turn, the endpoint controller may further generate a relevant error message or interrupt to the compute die. Understand while shown at this high level in the embodiment of FIG. 1, many variations and alternatives are possible.

Figure 2:
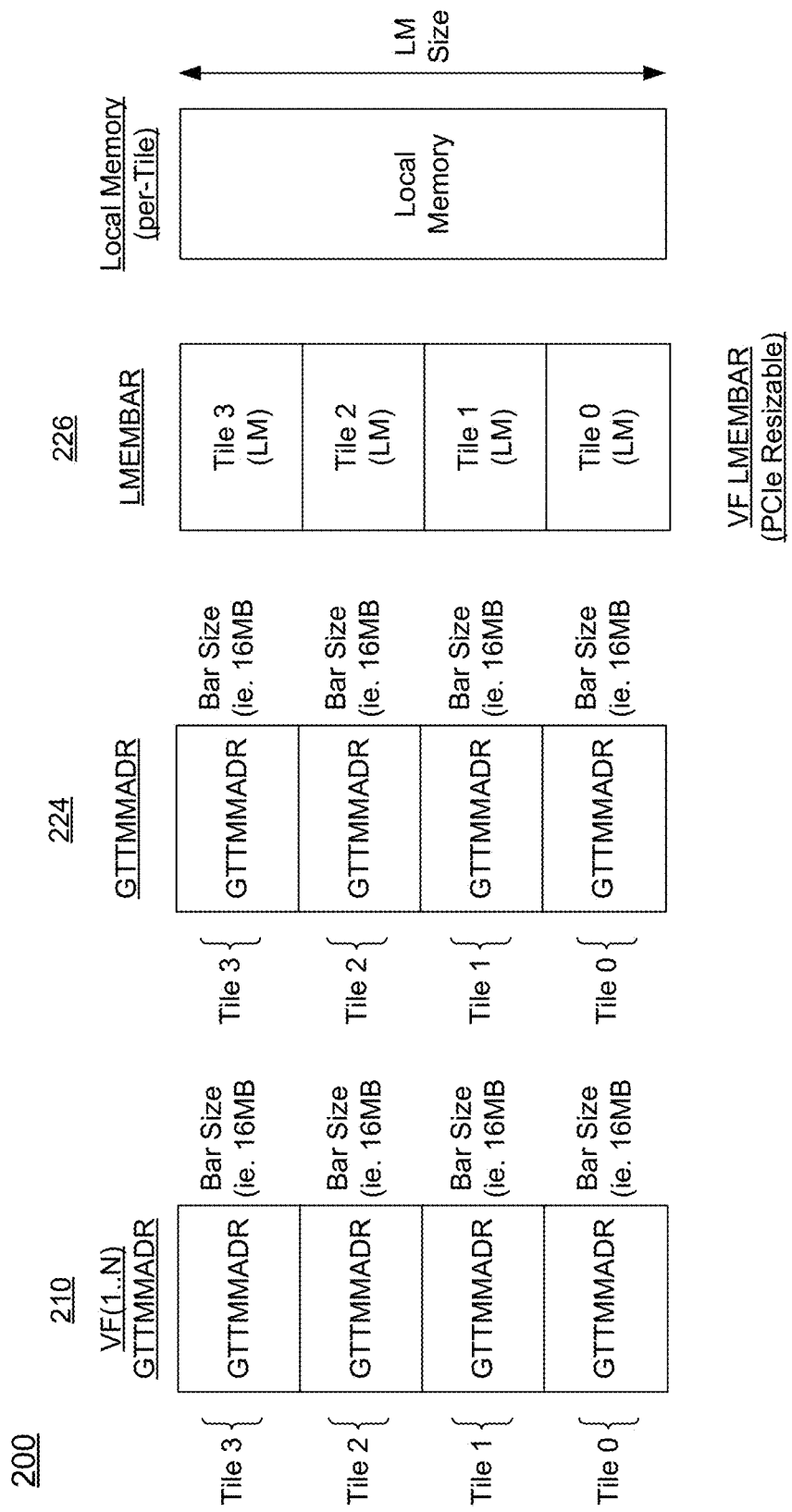
FIG. 2 is a block diagram of a set of base address register assignments for multiple tiles in accordance with an embodiment.

In an embodiment, a memory view may be configured for an accelerator device using a root tile, which calculates BARs for the connected tiles. Referring now to FIG. 2, shown is a block diagram of a set of base address register assignments for multiple tiles in accordance with an embodiment. More specifically, FIG. 2 shows an arrangement for setting of base address registers for memory mapped IO registers (referred to herein as GTTMMADR) and local memory, both for multiple tiles and for multiple virtual functions (with regard to the MMIO registers). Specifically, a root tile may be configured, either statically using board straps, according to code stored in an attached option ROM, or a combination. Ultimately, the tile configuration method calculates BARs for the additional tiles, both for MMIO registers and for local memory, for a controllable number of virtual functions (and a physical function).

Thus as illustrated in FIG. 2, each of four tiles may be configured with a BAR 210 for each of a plurality of virtual functions for MMIO register space. In addition, the tile may be configured with another BAR 224 for a physical function. Also, each tile may be configured with another BAR 226 for local memory. Note that for virtual functions, the local memory BAR may be PCIe resizable.

In one embodiment, BAR calculations may be performed as follows in Table 1 for a 1 tile configuration, and as shown in Table 2, for a 4 tile configuration. The example below includes both single root IO virtualization (SRIOV) with N total virtual functions (VFs)) and illustrates 1 and 4 tile configuration examples. Understand that this MMIO register accessibility extends to other tile count configurations.

TABLE 1

| 1 tile: |
| --- |
| GTTMMADR=BAR size (i.e., 16MB)<br>If N VFs, then VF GTTMMADR = N*BAR size (i.e., N*16MB).<br>LMEMBAR=LM(i.e., Local Memory) size attached<br>VF LMEMBAR(s) = VF(i.e., Virtual Function) LM size selected. |

TABLE 2

| 4 tile: |
| --- |
| GTTMMADR=4 tile * (BAR size/tile)<br>If BAR size=16MB and N VFs then<br>4 tile *16MB/tile = 64MB<br>VF GTTMMADR = N*64MB (when N is the total VFs).<br>LMEMBAR=4 tiles * (LM size/tile)<br>VF LMEMBAR(s) =4 tiles *(VF LM size/tile) |

Figure 3:
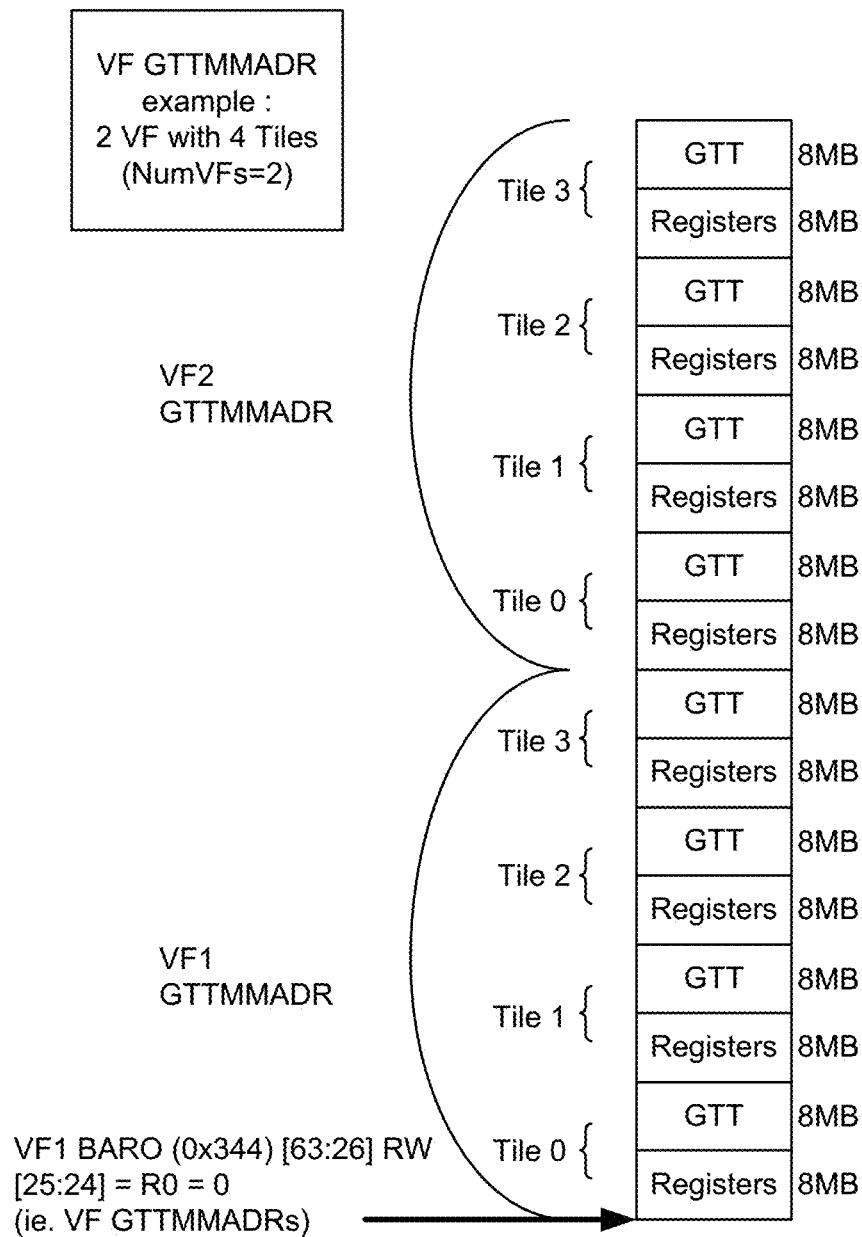
FIG. 3 is an example memory map for memory mapped input/output registers in accordance with an embodiment.

Referring now to FIG. 3, shown is an example memory map for memory mapped I/O registers in an implementation of an accelerator device in accordance with an embodiment. More specifically as shown in FIG. 3, map 300 shows GTTMMADR BAR split into 2 8 MB regions; 8 MB for MMIO registers and 8 MB for a Global Translation Table (GTT) stored in local memory. As shown in FIG. 3, in map 300, GTTMMADR expands on a per tile basis for each of multiple virtual functions. In an embodiment, map 300 may be stored in a set of configuration registers of the root tile. And as described herein, this root tile may decode system address information of incoming messages from a compute die to identify a corresponding BAR to which the communication is directed and forward along to the destination (either internal to the root tile, to a remote tile, or to a local memory attached to one of the tiles). In the view of FIG. 3, GTTMMADR, although one BAR, is split into 2 separate regions. The lower 8 MB is reserved for MMIO registers, and the upper 8 MB is reserved for writing the global translation table in local memory. In other embodiments, two separate BARs may be implemented, but PCIe limits the number of BARs that can be defined.

Figure 4:
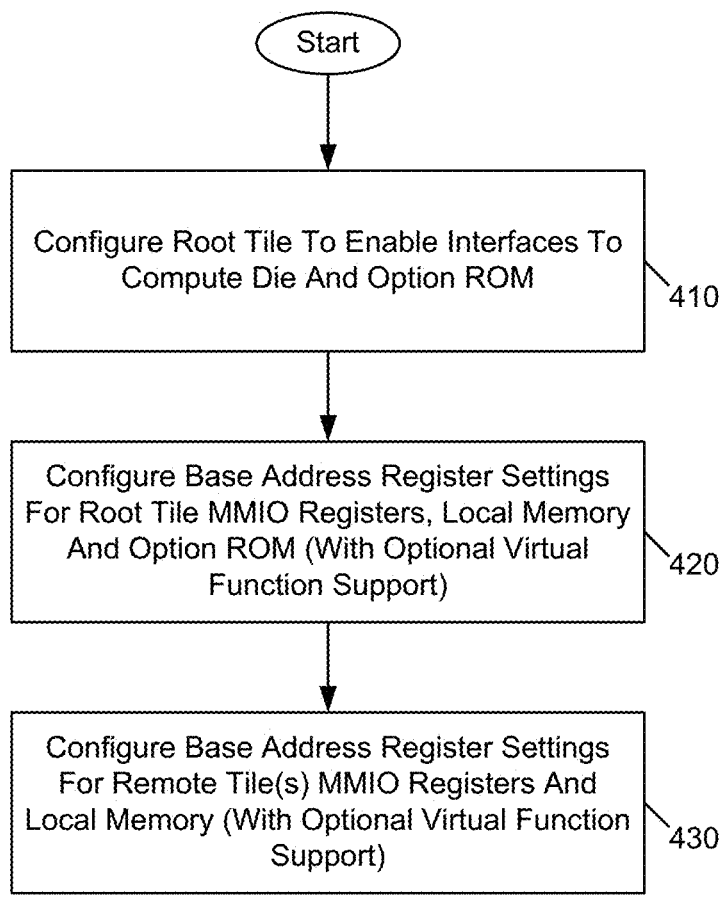
FIG. 4 is a flow diagram of a method in accordance with an embodiment of the present invention.

Referring now to FIG. 4, shown is a flow diagram of a method in accordance with an embodiment of the present invention. More specifically, method 400 is a method for configuring an accelerator device having multiple identical tiles where only a single tile directly couples to a compute die as a PCIe device. In embodiments, method 400 may be performed by hardware circuitry, firmware, software and/or combinations thereof. For example, method 400 may be performed using hardware circuitry such as an endpoint controller of the root tile, to perform configuration operations upon initialization of an accelerator device.

As illustrated, method 400 begins by configuring a root tile to enable interfaces to the compute die and an option ROM (block 410). Such configuration may include activating interfaces within an endpoint controller to enable communications via a PCIe interconnect and a memory interconnect to which the option ROM couples. Such configuration may occur based on package strap information or so forth. Next at block 420, BAR settings for the root tile MMIO registers, local memory and the option ROM may be configured, in a set of configuration registers of the root tile.

Note that such configuration may also include support for virtual functions if present. In an embodiment, these configuration operations may calculate BAR sizes according to an embodiment as described above with regard to Tables 1 and 2.

Next, at block 430, firmware or other software configures base registers and other initialization-related registers within a remote tile's MMIO register space. Similar to a root tile, settings for remote tile MMIO registers and local memory may be configured. Note that these register settings may also reside locally within the root tile registers. However, PCIe configuration space registers are only written in the root tile, and configuration accesses are not forwarded to remote tiles.

TABLE 3

| SGunit portID straps | PortID Value (hex) | Active |
|---|---|---|
| SGunit | 93 | Root&Remote |
| Tile1 | E9 | Root |
| Tile2 | C9 | Root |
| Tile3 | CA | Root |
| Tile0 strap = f(Remote Tile #) | | |
| Tile0 (0) | NA - No strap | NA |
| Tile0 (1) | E9 | Remote |
| Tile0 (2) | D9 | Remote |
| Tile0 (3) | EA | Remote |

TABLE 4

| | | | Source SB Packet | | | Receiver SB Packet | | |
|---|---|---|---|---|---|---|---|---|
| | Source | Destination | SRCID | DESTID | Comments | SRCID | DESTID | Comments |
| Tile 0 | SGunit | Tile0 SGunit | | | | | | |
| | | Tile1 SGunit | 93 | E9 | DestID = Tile1 strap | E9 | 93 | SGunit determines Tile1 SQ (Tile0 (1) strap = Rcved SRCID) |
| | | Tile2 SGunit | 93 | C9 | DestID = Tile2 strap | D9 | 93 | SGunit determines Tile1 SQ (Tile0 (2) strap = Rcved SRCID) |
| | | Tile3 SGunit | 93 | CA | DestID = Tile3 strap | EA | 93 | SGunit determines Tile1 SQ (Tile0 (3) strap = Rcved SRCID) |
| Tile 1 | SGunit | Tile0 SGunit | 93 | E9 | DestID = Tile0 (1) strap | E9 | 93 | Service Queue used : SRCID PortID = Tile0 (1) strap |
| | | Tile1 SGunit | 93 | | | | | |
| | | Tile2 SGunit | 93 | | | | | |
| | | Tile3 SGunit | 93 | | | | | |
| Tile 2 | SGunit | Tile0 SGunit | 93 | D9 | DestID = Tile0 (2) strap | C9 | 93 | Service Queue used : SRCID PortID = Tile0 (2) strap |
| | | Tile1 SGunit | 93 | | | | | |
| | | Tile2 SGunit | 93 | | | | | |
| | | Tile3 SGunit | 93 | | | | | |
| Tile 3 | SGunit | Tile0 SGunit | 93 | EA | DestID = Tile0 (3) strap | CA | 93 | Service Queue used : SRCID PortID = Tile0 (3) strap |
| | | Tile1 SGunit | 93 | | | | | |
| | | Tile2 SGunit | 93 | | | | | |
| | | Tile3 SGunit | 93 | | | | | |

That is, while remote tiles may include PCIe configuration space registers as manufactured, when implemented in an accelerator device exposed as a single PCIe device, these registers are ignored and not written to within the remote tiles. Understand while shown at this high level in the embodiment of FIG. 4, many variations and alternatives are possible. At a conclusion of a configuration process as in FIG. 4, an accelerator device is fully configured and ready for normal operation, including handling communications received from a compute die, as well as performing intra-tile communications. However, MMIO registers related to initializing remote tiles are written (namely various memory base registers, interrupt masks, and other initialization-related registers).

Note that each endpoint controller may include a mapping table to store its port identifier and the corresponding port identifiers to target endpoint controllers of the other tiles. Referring now to Table 3, shown is an illustration of mapping of port identifiers for root and remote tiles. More specifically, Table 3 shows a mapping of port identifiers for endpoint controllers of the different tiles. And in turn, in Table 4, a technique is shown for determining source and destination port identifiers for messages targeting endpoint controllers of the different tiles (note that "SGunit" in Table 4 is used to refer to an endpoint controller).

Note further that an incoming memory write transaction that targets a register portion of a MMIO BAR for a remote tile, which may be received as a posted write transaction from the compute die, may be converted into a non-posted write transaction within the root tile. After conversion, the non-posted write transaction is sent to a destination remote tile via a sideband interconnect system. In this way, a given write transaction results in a write completion returned to the root tile so that ordering can be maintained, such that a next write is not processed until this first write transaction is completed. Note that similar conversion to non-posted write transactions also may occur for incoming write transactions targeting the root tile. Note IP blocks on a root or remote tile may generate posted write transactions on the sideband interconnect system.

To provide register communications intra-tile, embodiments may use sideband-based communications as described herein in which address information can be used to identify a destination tile (and corresponding IP block within such destination tile). Referring now to Table 5, shown is an example encoding of address information (namely an address offset portion of an incoming system address) to direct a register-based communication to a given tile.

TABLE 5

| | |
|---|---|
| 1. | IOSF SB address offset[31:0]:<br>[31:27] = Reserved<br>[26:24] = Tile number (<br>☐ 0h=Local Tile,<br>☐ 1h=Remote Tile 1,<br>☐ 2h=Remote Tile 2,<br>☐ 3h=Remote Tile 3,<br>☐ 4h-7h=reserved.<br>[23] = Reserved<br>[22:0] = Address offset within GTTMMADR BAR. |

In an embodiment, to avoid requiring all local tile intellectual property blocks to comprehend tile number and tile count, only an endpoint controller or specialized IP blocks such as a global microcontroller may be configured to comprehend such information. Otherwise, to enable communication to a given IP block, a tile number field (which in an embodiment may be implemented as address bits [26:24] as described above) may be set to "0h" for all local tile destination accesses. In this way, for a remote tile-to-remote tile access, the endpoint controller of the root tile may forward a message, via a sideband router, with the tile number field set to "0h," allowing the receiving endpoint controller of the receiving tile to determine that the access targets a local die IP unit. In opposite direction, an endpoint controller within a remote tile recognizes a non-zero tile number as a direction to forward the given access onto the root tile. And in turn if a received message has a non-zero tile number that matches the assigned value for a given remote tile, the endpoint controller of that remote tile may zero out the tile number in the sideband packet so that it may target a local IP block.

When a register BAR (e.g., MMIO register) PCIe access is received in the root tile, the endpoint controller of the root tile decodes it to determine whether the access is local to the root tile or directed to a remote tile. When directed to a remote tile, the root tile forwards the access along the sideband network to the targeted remote tile, and more specifically using a port identifier of the endpoint controller of the remote tile. When received, the endpoint controller of the remote tile decodes the access to determine the targeted or destination device block on that remote tile.

Figure 5:
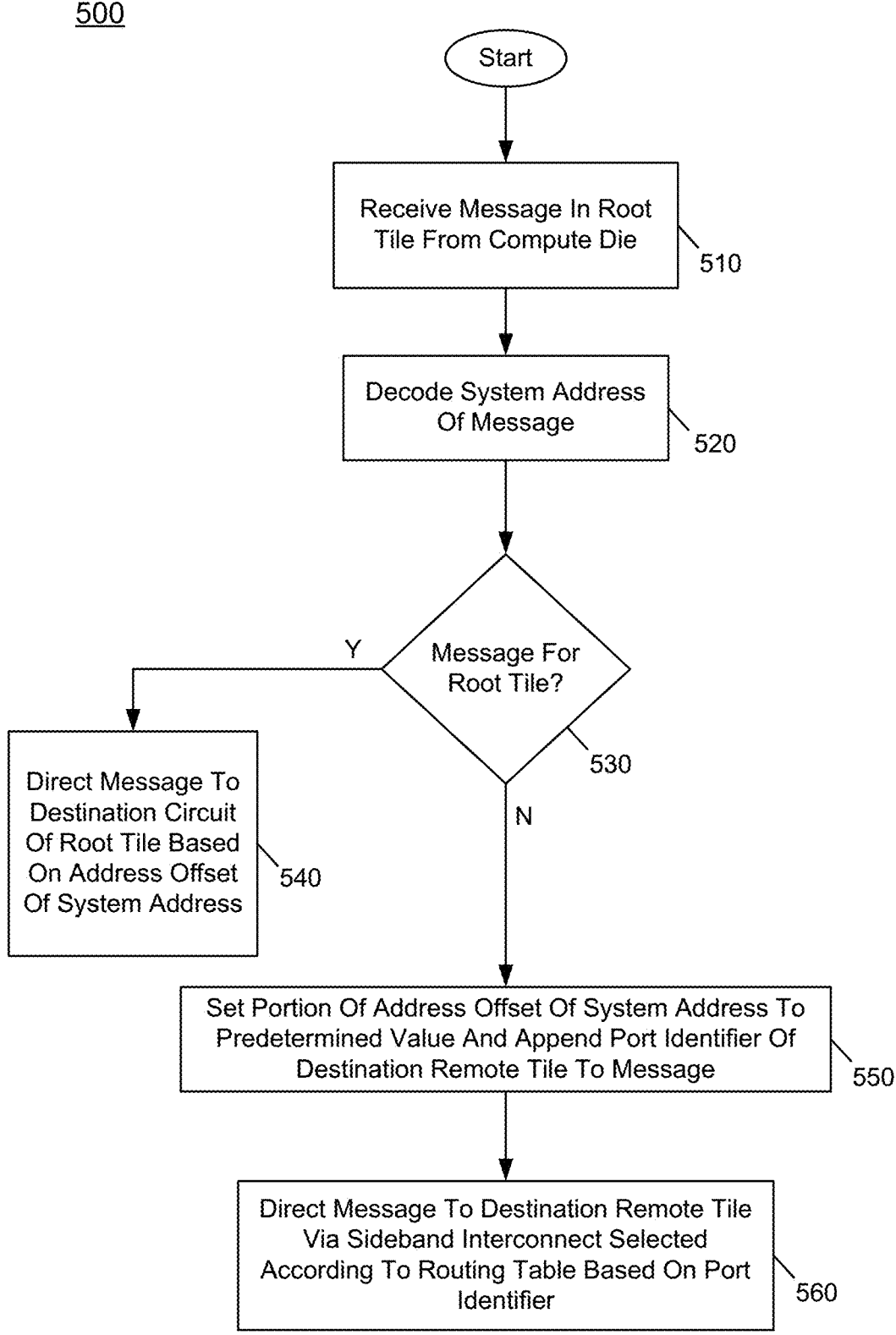
FIG. 5 is a flow diagram of a method in accordance with another embodiment of the present invention.

Referring now to FIG. 5, shown is a flow diagram of a method in accordance with another embodiment of the present invention. More specifically, method 500 of FIG. 5 is a method for handling an incoming message received from a compute die. In embodiments, method 500 may be performed by hardware circuitry, firmware, software and/or combinations thereof. For example, method 500 may be performed using hardware circuitry such as an endpoint controller of the root tile, to handle an incoming message. As one example, assume that the incoming message is a memory write to an MMIO register of a given tile, namely a register write request.

As illustrated, method 500 begins by receiving a message in the root tile from the compute die (block 510). Such message may be received via a PCIe interconnect. More specifically, this message may be received in an endpoint controller of the root tile via an IOSF primary channel, after being received via a PCIe channel in a PCIe endpoint controller. At block 520, the endpoint controller may decode the system address of the incoming message to determine a destination. Based on this decoding, it may be determined at diamond 530 if the message is for the root tile. In one embodiment, the endpoint controller may perform BAR decoding of the system address of the received memory access. If the BAR portion of the system address decodes to a root tile register portion of a MMIO BAR, control passes to block 540 where the message is directed to a destination circuit (e.g., a given computing block) of the root tile. As an example, if there are 4 tiles, there is a 64 MB GTTMMADR BAR. Address bits above 64 MB determine a BAR hit. Those bits are then stripped, leaving a 64 MB offset. The next 2 bits determine which tile is targeted (namely which 16 MB tile allocation is targeted). The remains bits (which are the 16 MB offset) are decoded to determine whether a transaction is IP targeted (lower 8 MB) or GTT targeted.

In a particular embodiment, this determination of the destination circuit within the local tile may be based on an address offset of the system address (namely address bits [22:0]) of the incoming message. This portion of an address offset of the system address thus may be used to identify the particular device block (e.g., IP circuit) on the local tile to which the access is directed. Note that the actual communication to the local IP circuit within the local tile may be directed from the endpoint controller to the sideband router and in turn from the sideband router to the destination circuit (e.g., as present in a graphics engine of the tile).

Instead if it is determined at diamond 530 that based on the BAR decode of the system address, the message is not directed to an agent of the root tile, control passes to block 550 where the endpoint controller of the root tile may set a predetermined portion of the address offset to a predetermined value. More specifically, the endpoint controller may set address bits [26:24] to zeros, which is thus an indication to a receiving endpoint controller that the message is directed to an agent within that local tile. In addition, at block 550 the endpoint controller of the root tile further may append a port identifier of the destination remote tile to the message. In an embodiment, the endpoint controller may access a mapping table having port identifiers for each of the tiles to obtain the appropriate port identifier.

As discussed above, the compute die may send an incoming MMIO register access as a posted transaction. To ensure correct and efficient receipt while using limited resources (e.g., receiving buffers within the tiles), embodiments may cause the incoming posted write transaction received via a PCIe interconnect to be converted into a non-posted write transaction to be sent along a sideband interconnect system (e.g., according to an Intel® IOSF communication protocol). As such, the endpoint controller of the root tile may further at block 550 convert the incoming posted write transaction into a non-posted write transaction.

Thereafter, control passes to block 560, where the message may be directed to its appropriate destination. To this end, the endpoint controller of the root tile sends the message (as modified) to a sideband router of the root tile, which may forward the message to the appropriate directly attached remote tile by a sideband interconnect system. More specifically, the sideband router may access its routing tables using the port identifier appended to the message by the local endpoint controller. With this port identifier, the sideband router accesses its routing tables to identify the appropriate remote tile to direct the message to.

In addition, embodiments may ensure correct communication and receipt of messages by ensuring that sufficient receiving resources (e.g., buffers) are present at the receiver end. To this end, embodiments may implement a multi-level credit protocol. That is, embodiments in which these register-based communications are sent via a sideband interconnect system may leverage both the native credit protocol of the sideband interconnect system and an additional credit protocol, to ensure that resources are available in receivers.

In a particular embodiment herein, understand that endpoint controllers of the tiles, which are the initial destination of incoming register messages, may include at least one so-called service queue or other buffer to store some number of incoming non-posted messages and posted write messages. For example, in one embodiment, each endpoint controller may include service queues having N non-posted entries and M posted entries. The root tile may be configured with one set of service queues per remote tile. The root tile service queues enqueue respective received remote tile non-posted and posted messages. In addition, each remote tile has a set of service queues for received root tile accesses. To ensure that there are sufficient available entries for storing incoming message information, the endpoint controllers may send credit messages via the sideband interconnect to the other tiles with pointer information to identify the current available entries within the service queue. With this information, a sender (e.g., the endpoint controller of the root tile) may withhold sending messages to a given destination tile when that destination tile does not have available entries in its service queue to store the information.

Understand that this credit protocol is separate from the credit protocol for the sideband interconnect system itself. With this arrangement, it is possible for the sideband interconnect to have sufficient resources to communicate messages, but a sender may withhold sending such messages due to a lack of resources at the receiver. And vice-versa, it is possible for the receiver to have sufficient resources, but the sideband interconnect system may lack sufficient resources in other situations. As such, embodiments provide a multi-level credit protocol to ensure that both interconnect system and receiver have sufficient resources before a given communication is sent to the receiver. Understand while shown at this high level in the embodiment of FIG. 5, many variations and alternatives are possible.

Figure 6:
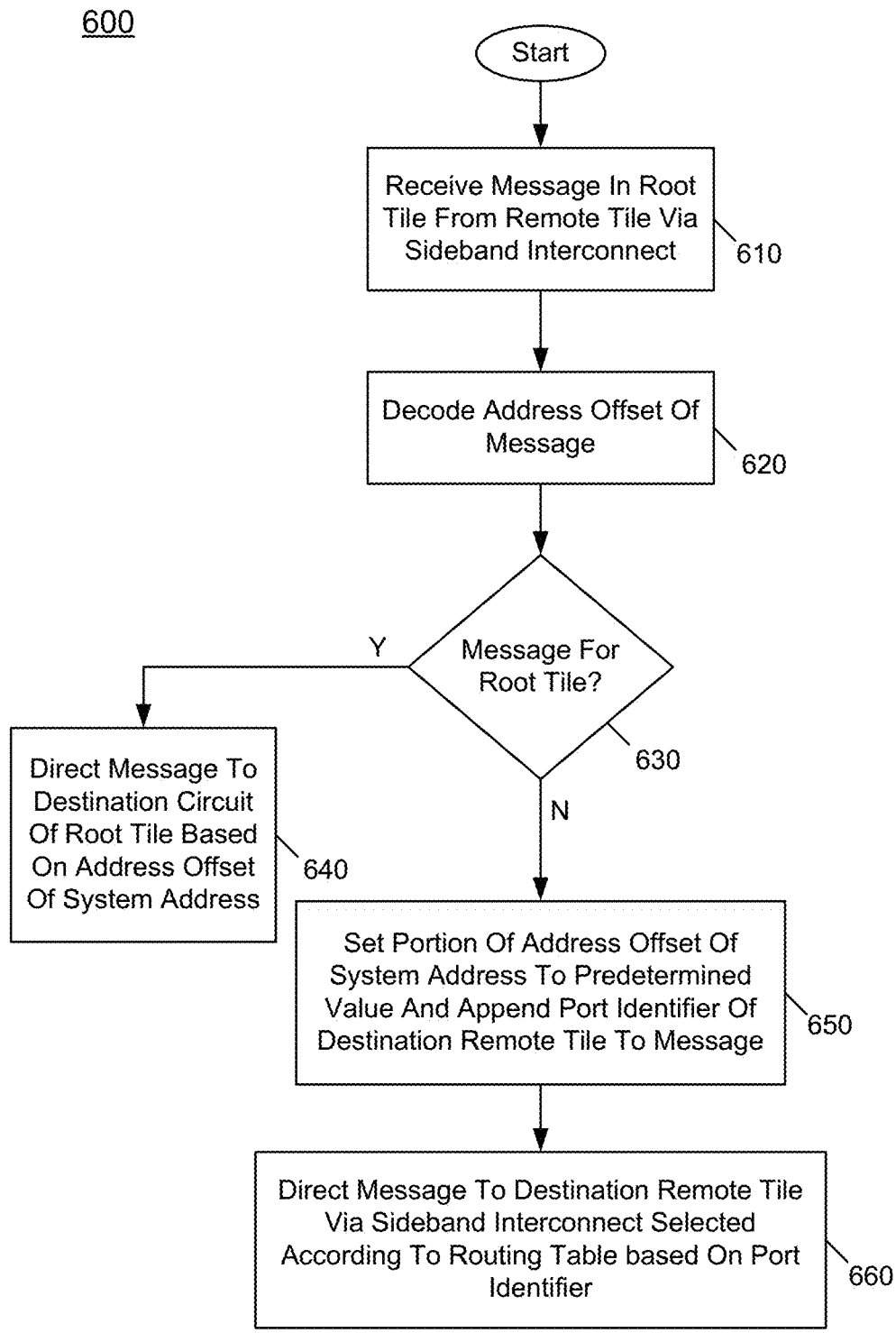
FIG. 6 is a flow diagram of a method in accordance with yet another embodiment of the present invention.

Referring now to FIG. 6, shown is a flow diagram of a method in accordance with another embodiment of the present invention. More specifically, method 600 of FIG. 6 is a method for handling an incoming message received in a root tile from a remote tile. In embodiments, method 600 may be performed by hardware circuitry, firmware, software and/or combinations thereof. For example, method 600 may be performed using hardware circuitry such as an endpoint controller of the root tile, to handle an incoming message. As one example, assume that the incoming message is a posted write to an MMIO register of a given tile, namely a register write request.

As illustrated, method 600 begins by receiving a message in the root tile from a remote tile (block 610). Such message may be received via a sideband interconnect. At block 620, the endpoint controller may decode an address offset of the incoming message. Based on this decoding, it may be determined at diamond 630 if the message is for the root tile. In one embodiment, the endpoint controller may determine the message to be for the root tile when address bits [26:24] are set to zero. If so, control passes to block 640 where the message is directed to a destination circuit (e.g., a given computing block) of the root tile, e.g., based address bits [22:0] of the incoming message.

Instead if it is determined at diamond 630 that based on the decode, the message is not directed to an agent of the root tile, control passes to block 650 where the endpoint controller of the root tile may set a predetermined portion of the address offset (address bits [26:24]) to a predetermined value. In addition, at block 650 the endpoint controller of the root tile further may append a port identifier of the destination remote tile to the message.

Thereafter, control passes to block 660, where the message may be directed to its appropriate destination. To this end, the endpoint controller of the root tile sends the message (as modified) to a sideband router of the root tile, which may forward the message to the appropriate directly attached remote tile by a sideband interconnect system. Understand while shown at this high level in the embodiment of FIG. 6, many variations and alternatives are possible.

Figure 7:
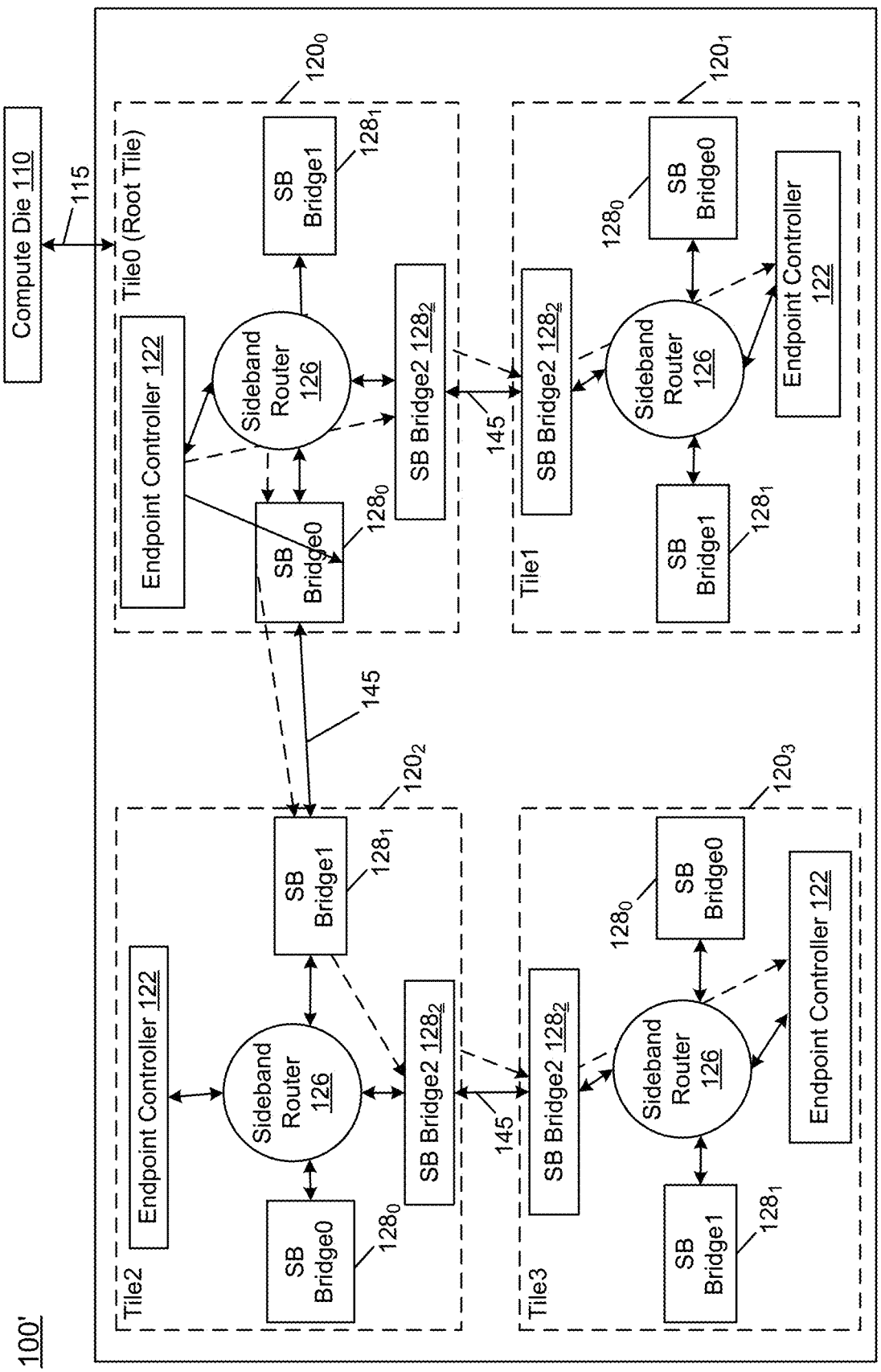
FIG. 7 is a block diagram of an accelerator device illustrating exemplary root tile-to-remote tile communications in accordance with an embodiment.

Referring now to FIG. 7, shown is a block diagram of an accelerator device illustrating exemplary root tile-to-remote tile communications in accordance with an embodiment. In general, system 100' is configured the same as system 100 of FIG. 1. However, certain additional components are shown in FIG. 7, namely a plurality of sideband bridges $128_{0-2}$, which are used to provide sideband communications between corresponding sideband routers 126 and sideband interconnects 145.

As illustrated in FIG. 7, incoming register write communications may be received from compute die 110 (e.g.,) to be directed to remote tiles $120_1$ and $120_3$. As seen, each of these transactions, which may be decoded and converted into non-posted write transactions within endpoint controller 122 of root tile $120_0$, may be communicated based on destination port identifiers (appended onto the non-posted write transaction via endpoint controller 122 of root tile $120_0$), through corresponding sideband routers 126 and sideband bridges, resulting in their receipt within endpoint controller 122 of the local tile.

Figure 8:
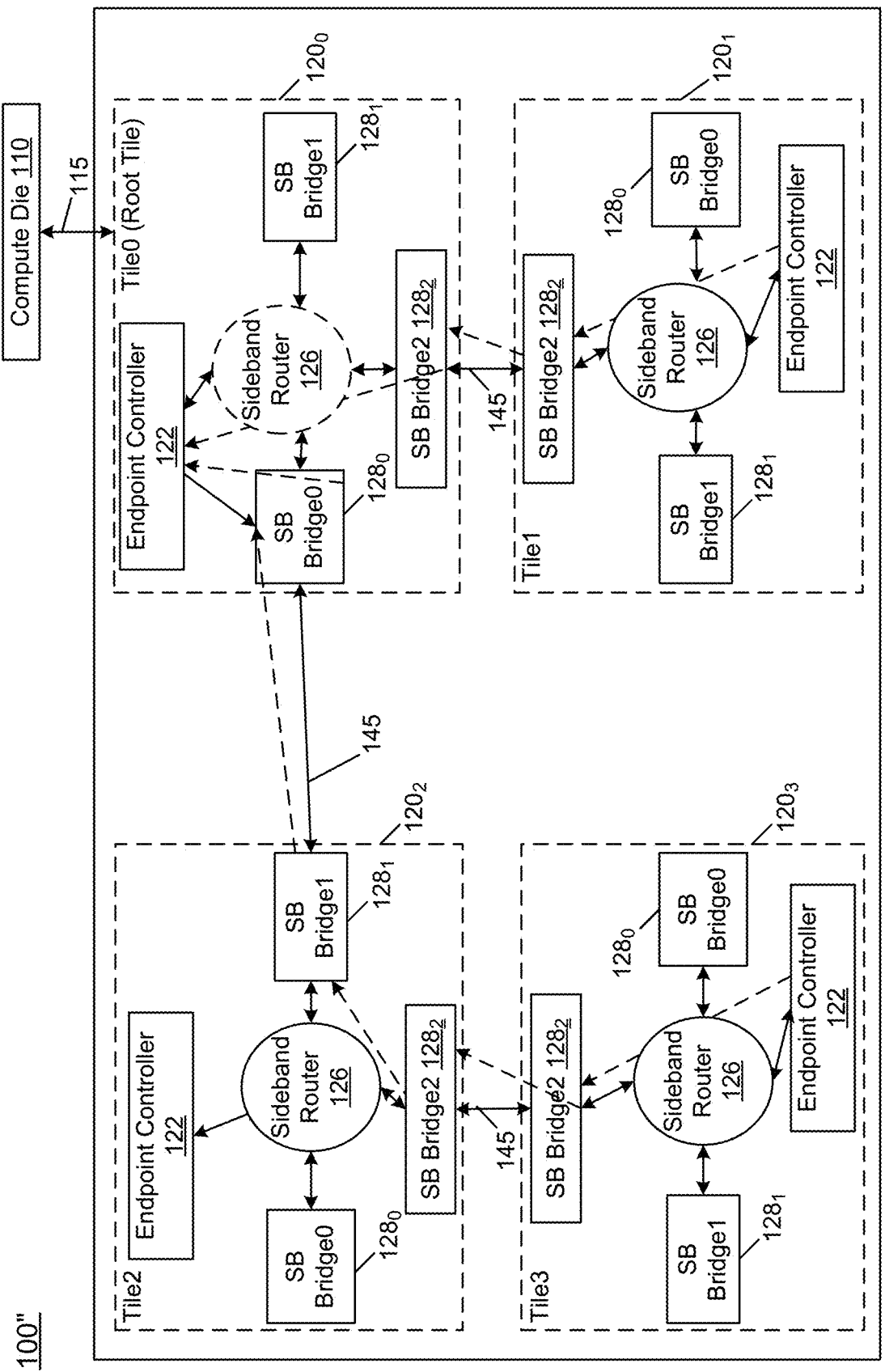
FIG. 8 is a block diagram of an accelerator device illustrating exemplary remote tile-to-root tile communications in accordance with an embodiment.

Referring now to FIG. 8, shown is a block diagram of an accelerator device illustrating exemplary remote tile-to-root tile communications in accordance with an embodiment. In general, system 100'' is configured the same as system 100' of FIG. 7. As illustrated in FIG. 8, remote tiles $120_1$ and $120_3$ may send communications to root tile $120_0$. As seen, each of these transactions flow through to root tile $120_0$, and more particularly to its endpoint controller 122.

Figure 9:
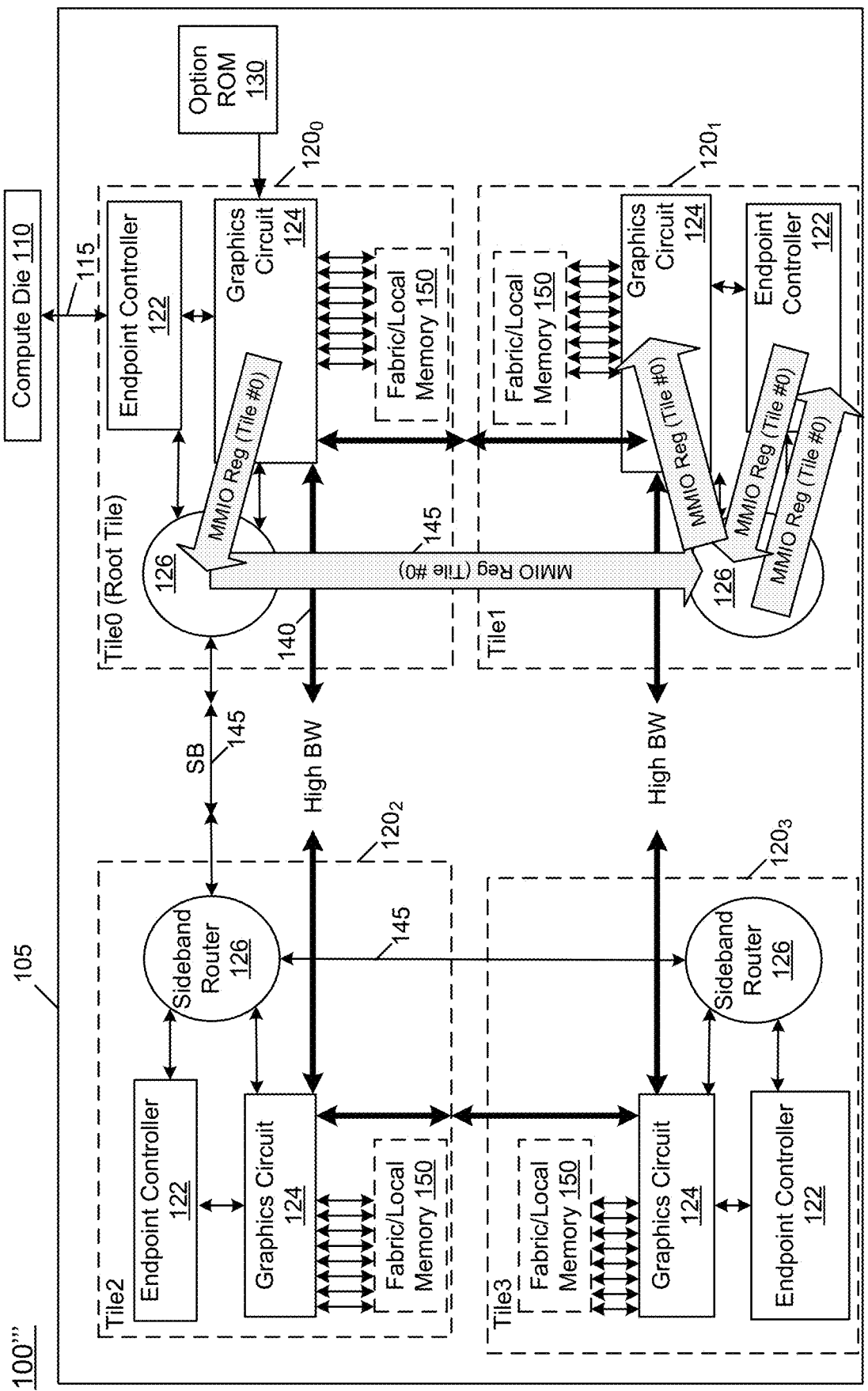
FIG. 9 is a block diagram of an accelerator device illustrating exemplary root tile-to-remote tile communications in accordance with another embodiment.

Referring now to FIG. 9, shown is a block diagram of an accelerator device illustrating exemplary root tile-to-remote tile communications in accordance with another embodiment. In general, system 100''' is configured the same as system 100 of FIG. 1. In the illustration of FIG. 9, an MMIO register access to a destination circuit present in graphics circuit 124 of remote tile $120_1$ is illustrated. As seen, this MMIO register access, if a write transaction, may be communicated as a non-posted write transaction directed from endpoint controller 122 of root tile $120_0$ to a destination IP circuit within graphics engine 124 of remote tile $120_1$. As illustrated, this transaction may be communicated via sideband routers 126. Note that when received in sideband router 126 of remote tile $120_1$, the transaction is forwarded to endpoint controller 122 of this local tile to decode the access. Then based on decoding of an address offset of bits [22:0], the transaction may be forwarded via sideband router 126 to graphics circuit 124 to reach its destination.

Figure 10:
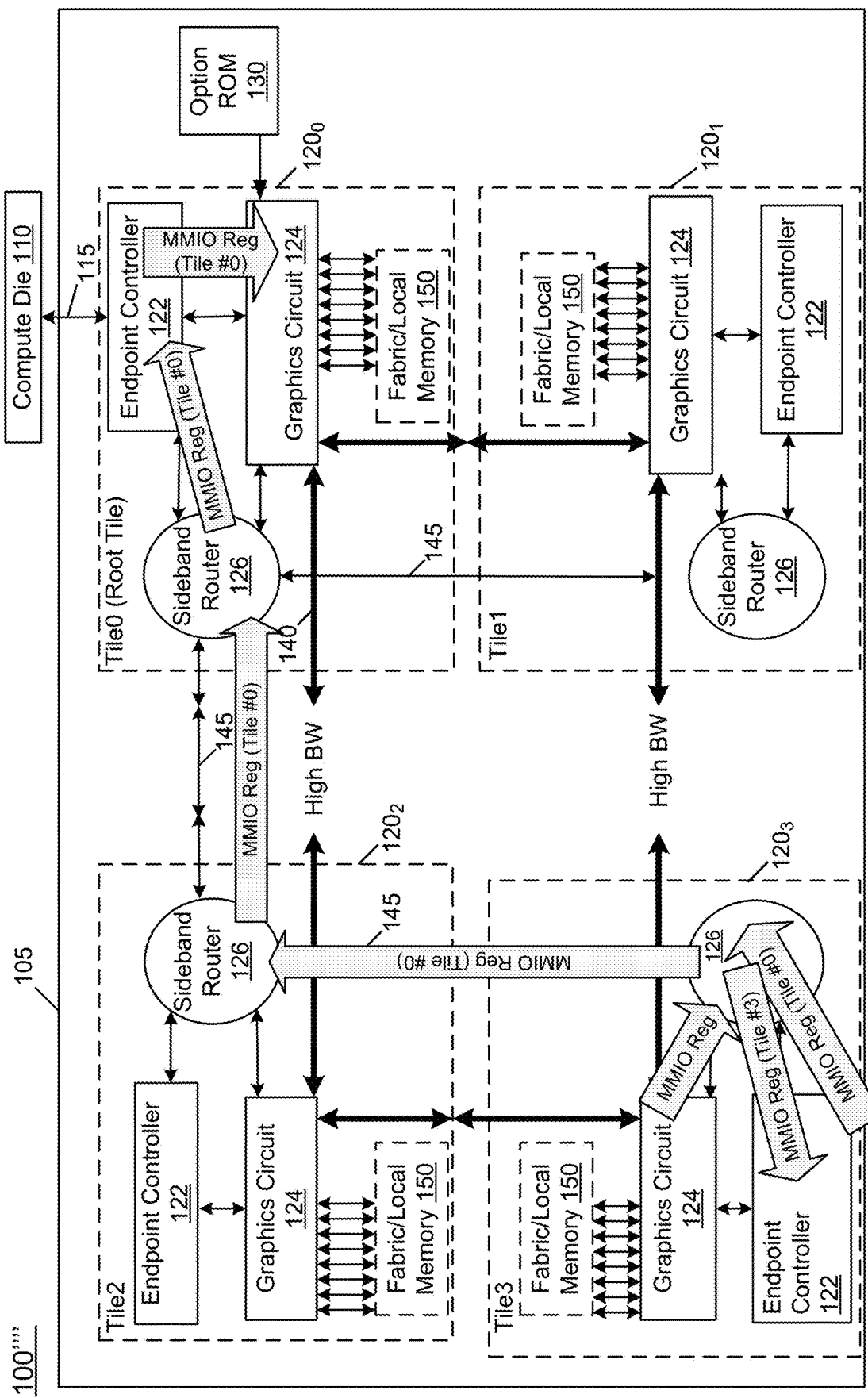
FIG. 10 is a block diagram of an accelerator device illustrating exemplary remote tile-to-root tile communications in accordance with another embodiment.

Referring now to FIG. 10, shown is a block diagram of an accelerator device illustrating exemplary remote tile-to-remote tile communications in accordance with yet another embodiment. In general, system 100'''' is configured the same as system 100''' of FIG. 9. In the illustration of FIG. 10, an MMIO register access to a destination circuit present in graphics circuit 124 of root tile $120_0$ is illustrated. As seen, this MMIO register access, if a write transaction, may be communicated as a posted write transaction. In an embodiment, received compute die writes are forwarded on the sideband interconnect system as non-posted writes for ordering reasons. However, writes that originate within a tile IP generally flow as posted writes for performance reasons. Posted write transactions directed from endpoint controller 122 of remote tile 120₃ to a destination IP circuit within graphics engine 124 of root tile 120₀. Note that endpoint controller 122 of remote tile 120₃ replaces its tile number with tile number 0 in address bits [26:24]. As illustrated, this transaction may be communicated via sideband routers 126, but at the high level shown, the traversal through remote tile 120₂ is not shown.

Figure 11:
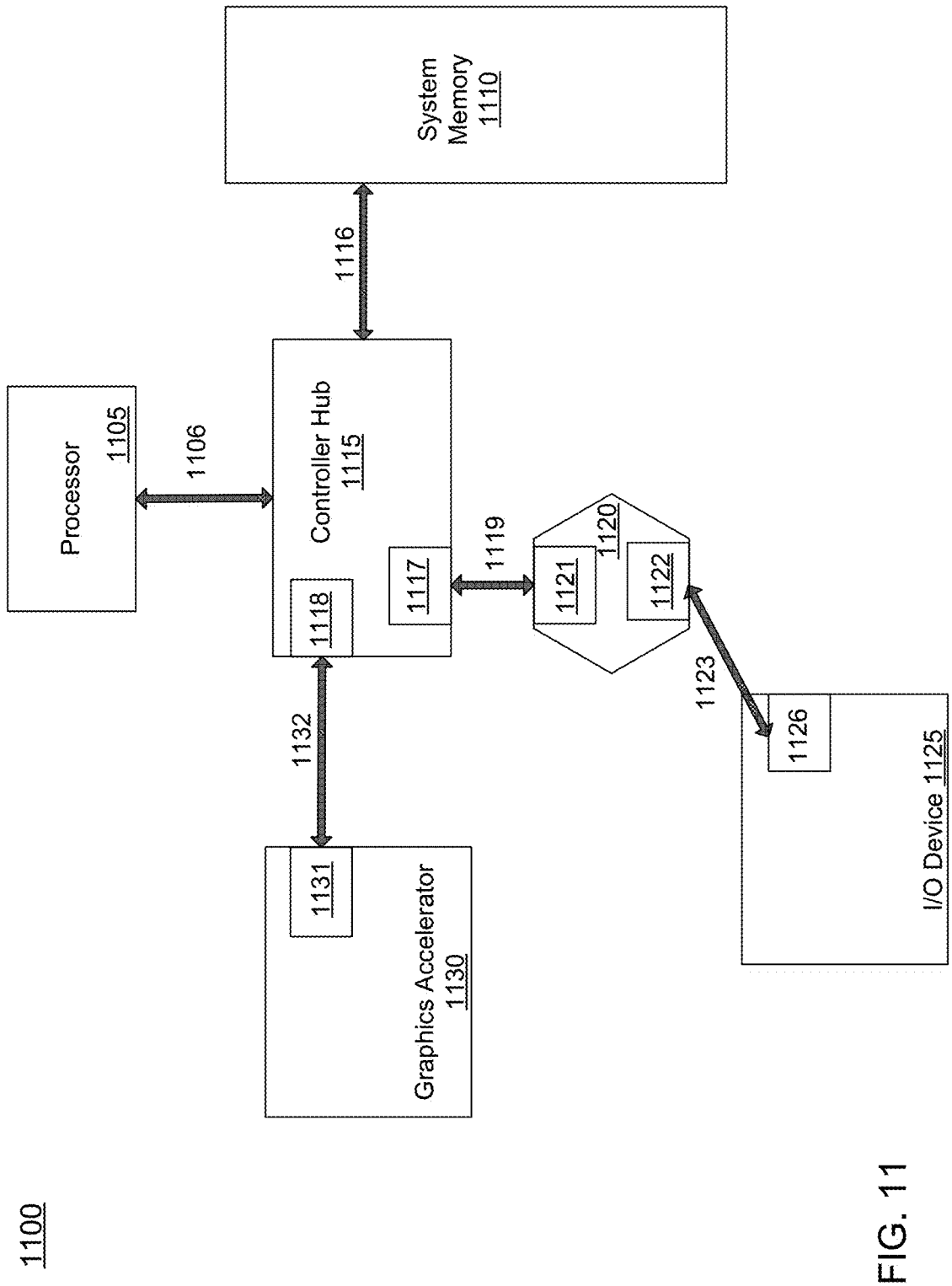
FIG. 11 is an embodiment of a fabric composed of point-to-point links that interconnect a set of components.

Embodiments may be implemented in a wide variety of interconnect structures. Referring to FIG. 11, an embodiment of a fabric composed of point-to-point links that interconnect a set of components is illustrated. System 1100 includes processor 1105 and system memory 1110 coupled to controller hub 1115. Processor 1105 includes any processing element, such as a microprocessor, a host processor, an embedded processor, a co-processor, or other processor. Processor 1105 is coupled to controller hub 1115 through front-side bus (FSB) 1106. In one embodiment, FSB 1106 is a serial point-to-point interconnect.

System memory 1110 includes any memory device, such as random access memory (RAM), non-volatile (NV) memory, or other memory accessible by devices in system 1100. System memory 1110 is coupled to controller hub 1115 through memory interface 1116. Examples of a memory interface include a double-data rate (DDR) memory interface, a dual-channel DDR memory interface, and a dynamic RAM (DRAM) memory interface.

In one embodiment, controller hub 1115 is a root hub, root complex, or root controller in a PCIe interconnection hierarchy. Examples of controller hub 1115 include a chip set, a memory controller hub (MCH), a northbridge, an interconnect controller hub (ICH), a southbridge, and a root controller/hub. Often the term chip set refers to two physically separate controller hubs, i.e. a memory controller hub (MCH) coupled to an interconnect controller hub (ICH). Note that current systems often include the MCH integrated with processor 1105, while controller 1115 is to communicate with I/O devices, in a similar manner as described below. In some embodiments, peer-to-peer routing is optionally supported through root complex 1115.

Here, controller hub 1115 is coupled to switch/bridge 1120 through serial link 1119. Input/output modules 1117 and 1121, which may also be referred to as interfaces/ports 1117 and 1121, include/implement a layered protocol stack to provide communication between controller hub 1115 and switch 1120. In one embodiment, multiple devices are capable of being coupled to switch 1120.

Switch/bridge 1120 routes packets/messages from device 1125 upstream, i.e., up a hierarchy towards a root complex, to controller hub 1115 and downstream, i.e., down a hierarchy away from a root controller, from processor 1105 or system memory 1110 to device 1125. Switch 1120, in one embodiment, is referred to as a logical assembly of multiple virtual PCI-to-PCI bridge devices. Device 1125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such a device is referred to as an endpoint. Although not specifically shown, device 1125 may include a PCIe to PCI/PCI-X bridge to support legacy or other version PCI devices. Endpoint devices in PCIe are often classified as legacy, PCIe, or root complex integrated endpoints.

Graphics accelerator 1130 is also coupled to controller hub 1115 through serial link 1132, which may be a PCIe link. In embodiments herein graphics accelerator 1130 may appear as a single PCIe device and may include a plurality of dies, each having the same physical configuration, but with a single root tile being the only die to interface directly with processor 1105, as described herein. In one embodiment, graphics accelerator 1130 is coupled to an MCH, which is coupled to an ICH. Switch 1120, and accordingly I/O device 1125, is then coupled to the ICH. I/O modules 1131 and 1118 are also to implement a layered protocol stack to communicate between graphics accelerator 1130 and controller hub 1115. A graphics controller or the graphics accelerator 1130 itself may be integrated in processor 1105.

Figure 12:
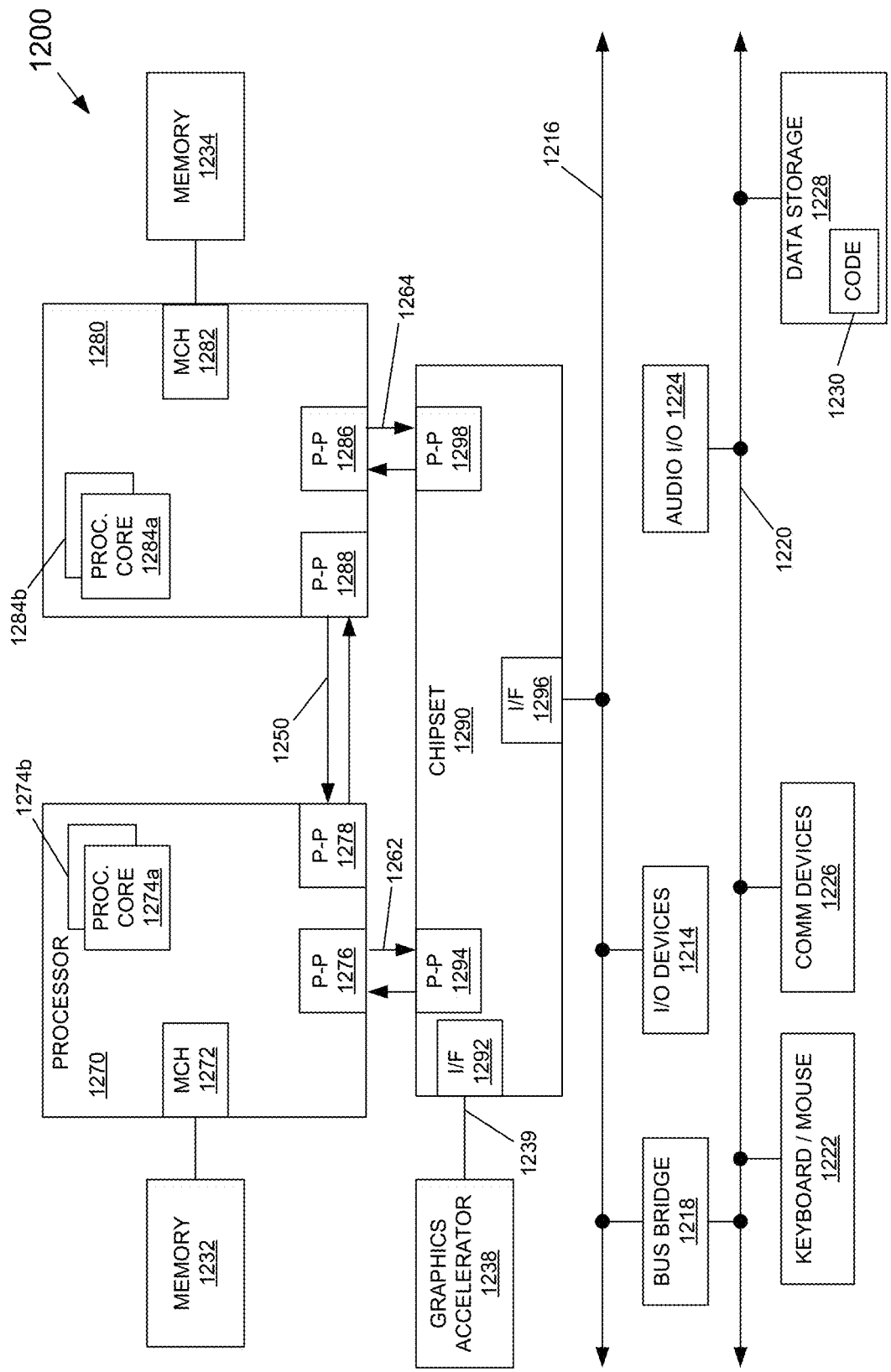
FIG. 12 is a block diagram of a system in accordance with an embodiment of the present invention.

Referring now to FIG. 12, shown is a block diagram of a system in accordance with an embodiment of the present invention. As shown in FIG. 12, multiprocessor system 1200 includes a first processor 1270 and a second processor 1280 coupled via a point-to-point interconnect 1250. As shown in FIG. 12, each of processors 1270 and 1280 may be many core processors including representative first and second processor cores (i.e., processor cores 1274a and 1274b and processor cores 1284a and 1284b).

Still referring to FIG. 12, first processor 1270 further includes a memory controller hub (MCH) 1272 and point-to-point (P-P) interfaces 1276 and 1278. Similarly, second processor 1280 includes a MCH 1282 and P-P interfaces 1286 and 1288. As shown in FIG. 12, MCH's 1272 and 1282 couple the processors to respective memories, namely a memory 1232 and a memory 1234, which may be portions of system memory (e.g., DRAM) locally attached to the respective processors. First processor 1270 and second processor 1280 may be coupled to a chipset 1290 via P-P interconnects 1262 and 1264, respectively. As shown in FIG. 12, chipset 1290 includes P-P interfaces 1294 and 1298.

Furthermore, chipset 1290 includes an interface 1292 to couple chipset 1290 with a graphics accelerator 1238, by a P-P interconnect 1239. In embodiments herein, graphics accelerator 1238 may be implemented with a plurality of dies such as accelerator device 105 of FIG. 1. As shown in FIG. 12, various input/output (I/O) devices 1214 may be coupled to first bus 1216, along with a bus bridge 1218 which couples first bus 1216 to a second bus 1220. Various devices may be coupled to second bus 1220 including, for example, a keyboard/mouse 1222, communication devices 1226 and a data storage unit 1228 such as a disk drive or other mass storage device which may include code 1230, in one embodiment. Further, an audio I/O 1224 may be coupled to second bus 1220.

The following examples pertain to further embodiments.

In one example, an apparatus includes a first die comprising a root tile. The root tile comprises: a first endpoint controller to couple to a compute die via a first interconnect, the first die having a first bus device function identifier; a graphics engine comprising a plurality of graphics processing units, the graphics engine coupled to the first endpoint controller via a primary channel of an on-die fabric; a sideband router coupled to the first endpoint controller and the graphics engine to communicate with a corresponding sideband router of at least one other die via a sideband interconnect; and a memory interconnect to couple the graphics engine to a local memory attached to the first die, where the root tile is to configure a set of configuration registers to allocate a plurality of BARs for the first die and the at least one other die.

In an example, the apparatus comprises a graphics card including a plurality of dies comprising a plurality of tiles, where the at least one other die comprises at least one remote tile. The graphics card further comprises: the local memory, where the first interconnect is the only link to couple between the graphics card and the compute die; and an option ROM coupled to the first die.

In an example, the first endpoint controller comprises a multi-tile configuration register comprising a first field to store a tile number for the root tile and a second field to store a count of remote tiles coupled to the root tile.

In an example, each of the remote tiles comprises an endpoint controller, a graphics engine, and a sideband router, where the endpoint controller of each of the remote tiles is unconnected to the graphics engine of the remote tile and the first interconnect, and further is unconnected to the option ROM.

In an example, the root tile and the remote tiles comprise homogeneous dies, the root tile configured differently than the remote tiles to act as the root tile.

In an example, the root tile is to program in the set of configuration registers of the root tile the plurality of BARs for the remote tiles.

In an example, the root tile is to program a memory mapped input/output register BAR for a physical function that incorporates a memory mapped input/output space for the plurality of remote tiles and a plurality of memory mapped input/output register BARs for a plurality of virtual functions for each of the remote tiles, and a local memory BAR to comprehend the plurality of remote tiles.

In an example, the graphics card is presented to the compute die as a single device.

In an example, the first endpoint controller is to receive a posted write transaction from the compute die, convert the posted write transaction to a non-posted write transaction, and direct the non-posted write transaction to the at least one remote tile.

In an example, the first endpoint controller comprises an interrupt register having a plurality of state fields each associated with one of the plurality of tiles, where in response to a write transaction from a first remote tile, the interrupt register is to write first status information into a corresponding one of the plurality of state fields and send a message signaling interrupt to the compute die.

In an example, the at least one remote tile comprises a second endpoint controller comprising a service queue, and where the first endpoint controller is to: perform a first credit protocol with the second endpoint controller to determine whether there is at least one available entry in the service queue prior to sending a non-posted transaction or a posted transaction to the at least one remote tile; and perform a second credit protocol via the sideband router to determine whether the sideband interconnect has sufficient resources for the non-posted transaction or the posted transaction.

In another example, a method comprises: receiving, in a root tile of an accelerator device having a plurality of tiles including the root tile and a plurality of remote tiles, a message from a processor, the message comprising a register write request to a register of a first remote tile of the plurality of remote tiles; decoding, in an endpoint controller of the root tile, a system address of the message to identify a destination tile for the message, based at least in part on a base address register decode of the system address; and in response to identifying the first remote tile as the destination tile, updating a first portion of an address offset field to a predetermined value and directing the message to the first remote tile coupled to the root tile via a sideband interconnect.

In an example, the method further comprises appending a port identifier to the message to cause an endpoint controller of the first remote tile to decode the message and direct the decoded message to a local IP circuit of the first remote tile.

In an example, the register write request comprises a posted write transaction, and the method further comprises converting, in the endpoint controller of the root tile, the posted write transaction to a non-posted write transaction.

In an example, the method further comprises: receiving a second message in the endpoint controller of the root tile, the second message comprising a configuration register write request; and updating a configuration register of the root tile in response to the second message.

In an example, the method further comprises: receiving a third message in the root tile via the sideband interconnect from the first remote tile; decoding, in the endpoint controller of the root tile, a first portion of an address offset field of the third message to identify a destination tile for the third message, where the first portion of the address offset field of the third message comprises a non-zero value; updating the first portion of the address offset field of the third message to the predetermined value, and appending a port identifier for an endpoint controller of the destination tile to the third message; and directing the message to the destination tile coupled to the root tile via another sideband interconnect.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system includes: a processor including one or more cores to execute instructions; and an accelerator device coupled to the processor via a PCIe interconnect. The accelerator device comprises a plurality of tiles including a root tile, a plurality of remote tiles, and a non-volatile memory to store configuration information for the accelerator device, where the root tile is coupled to the PCIe interconnect and the non-volatile memory. The root tile may include: an endpoint controller to interface with the processor and the non-volatile memory; a graphics engine comprising a plurality of graphics processing units, the graphics engine coupled to the endpoint controller via a primary channel of an on-die fabric; a sideband router coupled to the endpoint controller and the graphics engine to communicate with a corresponding sideband router of at least one of the plurality of remote tiles via a sideband interconnect; and a memory interconnect to couple the graphics engine to a local memory attached to the root tile. The endpoint controller may decode a portion of a system address of a posted transaction from the processor to identify whether the posted transaction is directed to a local agent of the root tile or one of the plurality of remote tiles, where when the posted transaction is directed to a first remote tile, the endpoint controller is to is to convert the posted transaction to a non-posted transaction, set a tile portion of the system address to a predetermined value, append a port identifier of an endpoint controller of the first remote tile to the non-posted transaction, and direct the non-posted transaction to the first remote tile via the sideband router.

In an example, a second remote tile is to receive the non-posted transaction from the root tile in a sideband router of the second remote tile, and based at least in part on the port identifier of the endpoint controller of the first remote tile, the sideband router of the second remote tile is to send the non-posted transaction to the first remote tile via another sideband interconnect coupled between the second remote tile and the first remote tile.

In an example, the accelerator device is presented to the processor as a single PCIe device having a single bus device function identifier.

In an example, the endpoint controller of the root tile is, prior to directing the non-posted transaction to the first remote tile, to determine whether the first remote tile has buffer space for the non-posted transaction based on pointer information received from the first remote tile, and where the sideband interconnect has an independent credit protocol.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a first die comprising a root tile, the first die being a component of a multi-die structure to present to a compute die as a single device having a single bus device function identifier, the root tile comprising:
    a root tile endpoint controller to couple to the compute die via a first interconnect, the first die having the single bus device function identifier;
    a root tile graphics engine comprising a plurality of graphics processing units, the root tile graphics engine to couple to the root tile endpoint controller via a primary channel of an on-die fabric;
    a root tile sideband router to couple to the root tile endpoint controller and the root tile graphics engine to communicate with a corresponding remote tile sideband router of at least one other die via a sideband interconnect, each of the at least one other die comprising a remote tile including the remote tile sideband router, a remote tile endpoint controller, and a remote tile graphics engine, wherein the remote tile endpoint controller is unconnected to the remote tile graphics engine; and
    a memory interconnect to couple the root tile graphics engine to a local memory to be coupled to the first die, wherein the root tile is to configure a set of configuration registers to allocate a plurality of base address registers (BARs) for the first die and the at least one other die, the at least one other die being a component of the multi-die structure to be presented to the compute device as the single device having the single bus device identifier.

2. The apparatus of claim 1, wherein the apparatus comprises a graphics card including a plurality of dies comprising a plurality of tiles, wherein the plurality of dies are components of the multi-die structure and the at least one other die comprises the at least one remote tile, the graphics card further comprising:
    the local memory, wherein the first interconnect is the only link to couple between the graphics card and the compute die; and
    an option read only memory (ROM) to be coupled to the first die.

3. The apparatus of claim 1, wherein the root tile endpoint controller comprises a multi-tile configuration register comprising a first field to store a tile number for the root tile and a second field to store a count of remote tiles coupled to the root tile.

4. The apparatus of claim 2, wherein the remote tile endpoint controller of each of the remote tiles is unconnected to the option ROM.

5. The apparatus of claim 1, wherein the root tile and the remote tiles comprise homogeneous dies, the root tile configured differently than the remote tiles to act as the root tile.

6. The apparatus of claim 1, wherein the root tile is to program in the set of configuration registers of the root tile the plurality of (BARs) for the remote tiles.

7. The apparatus of claim 6, wherein the root tile is to program a memory mapped input/output register BAR for a physical function that incorporates a memory mapped input/output space for the plurality of remote tiles and a plurality of memory mapped input/output register BARs for a plurality of virtual functions for each of the remote tiles, and a local memory BAR to comprehend the plurality of remote tiles.

8. The apparatus of claim 1, wherein the multi-die structure comprises a graphics card that is presented to the compute die as the single device.

9. The apparatus of claim 1, wherein the root tile endpoint controller is to receive a posted write transaction from the compute die, convert the posted write transaction to a non-posted write transaction, and direct the non-posted write transaction to the at least one remote tile.

10. The apparatus of claim 1, wherein the first endpoint controller comprises an interrupt register having a plurality of state fields each associated with one of the plurality of remote tiles, wherein in response to a write transaction from a first remote tile, the interrupt register is to write first status information into a corresponding one of the plurality of state fields and send a message signaling interrupt to the compute die.

11. The apparatus of claim 1, wherein the at least one remote tile comprises the remote tile endpoint controller comprising a service queue, and wherein the root tile endpoint controller is to:
perform a first credit protocol with the remote tile endpoint controller to determine whether there is at least one available entry in the service queue prior to sending a non-posted transaction or a posted transaction to the at least one remote tile; and
perform a second credit protocol via the root tile sideband router to determine whether the sideband interconnect has sufficient resources for the non-posted transaction or the posted transaction.

12. A non-transitory machine-readable medium having stored thereon instructions, which if performed by a machine cause the machine to perform a method comprising:
receiving, in a root tile of an accelerator device having a plurality of tiles including the root tile and a plurality of remote tiles, a message from a processor, the message comprising a register write request to a register of a first remote tile of the plurality of remote tiles, wherein the accelerator device including the root tile and the plurality of remote tiles is to present to the processor as a single device having a single bus device identifier and wherein each of the plurality of tiles includes an endpoint controller and a graphics engine, the endpoint controller of the root tile being coupled to the graphics engine of the root tile and the endpoint controller of each of the plurality of remote tiles being unconnected to the graphics engine of the remote tile;
decoding, in an endpoint controller of the root tile, a system address of the message to identify a destination tile for the message, based at least in part on a base address register decode of the system address; and
in response to identifying the first remote tile as the destination tile, updating a first portion of an address offset field to a predetermined value and directing the message to the first remote tile coupled to the root tile via a sideband interconnect.

13. The non-transitory machine-readable medium of claim 12, wherein the method further comprises appending a port identifier to the message to cause an endpoint controller of the first remote tile to decode the message and direct the decoded message to a local intellectual property (IP) circuit of the first remote tile.

14. The non-transitory machine-readable medium of claim 12, wherein the register write request comprises a posted write transaction, and the method further comprises converting, in the endpoint controller of the root tile, the posted write transaction to a non-posted write transaction.

15. The non-transitory machine-readable medium of claim 12, wherein the method further comprises:
receiving a second message in the endpoint controller of the root tile, the second message comprising a configuration register write request; and
updating a configuration register of the root tile in response to the second message.

16. The non-transitory machine-readable medium of claim 12, wherein the method further comprises:
receiving a third message in the root tile via the sideband interconnect from the first remote tile;
decoding, in the endpoint controller of the root tile, a first portion of an address offset field of the third message to identify a destination tile for the third message, wherein the first portion of the address offset field of the third message comprises a non-zero value and the destination tile comprises one of the plurality of remote tiles;
updating the first portion of the address offset field of the third message to the predetermined value, and appending a port identifier for an endpoint controller of the destination tile to the third message; and
directing the message to the destination tile coupled to the root tile via another sideband interconnect.

17. A system comprising:
a processor including one or more cores to execute instructions; and
an accelerator device coupled to the processor via a Peripheral Component Interconnect Express (PCIe) interconnect, the accelerator device comprising a plurality of tiles including a root tile, a plurality of remote tiles, and a non-volatile memory to store configuration information for the accelerator device, wherein:
the accelerator device including the root tile and the plurality of remote tiles is to present to the processor as a single device having a single bus device identifier and the root tile is coupled to the PCIe interconnect and the non-volatile memory and comprises:
an endpoint controller to interface with the processor and the non-volatile memory;
a graphics engine comprising a plurality of graphics processing units, the graphics engine to be coupled to the endpoint controller via a primary channel of an on-die fabric;
a sideband router to be coupled to the endpoint controller and the graphics engine to communicate with a corresponding sideband router of at least one of the plurality of remote tiles via a sideband interconnect; and
a memory interconnect to couple the graphics engine to a local memory to be coupled to the root tile, wherein the endpoint controller is to decode a portion of a system address of a posted transaction from the processor to identify whether the posted transaction is directed to a local agent of the root tile or one of the plurality of remote tiles, wherein when the posted transaction is directed to a first remote tile, the endpoint controller is to is to convert the posted transaction to a non-posted transaction, set a tile portion of the system address to a predetermined value, append a port identifier of an endpoint controller of the first remote tile to the non-posted transaction, and direct the non-posted transaction to the first remote tile via the sideband router; and
each of the plurality of remote tiles comprises a sideband router of the remote tile, an endpoint controller of the remote tile and a graphics engine of the remote tile, wherein the endpoint controller of the remote tile is unconnected to the graphics engine of the remote tile.

18. The system of claim 17, wherein a second remote tile is to receive the non-posted transaction from the root tile in a sideband router of the second remote tile, and based at least in part on the port identifier of the endpoint controller of the first remote tile, the sideband router of the second remote tile is to send the non-posted transaction to the first remote tile via another sideband interconnect coupled between the second remote tile and the first remote tile.

19. The system of claim 18, wherein the accelerator device is presented to the processor as a single PCIe device having the single bus device function identifier.

20. The system of claim 17, wherein the endpoint controller of the root tile is, prior to directing the non-posted transaction to the first remote tile, to determine whether the first remote tile has buffer space for the non-posted transaction based on pointer information received from the first remote tile, and wherein the sideband interconnect has an independent credit protocol.

\* \* \* \* \*